March 3, 1959     O. K. KELLEY     2,875,643
TRANSMISSION CONTROL SYSTEM
Filed Dec. 3, 1952     8 Sheets-Sheet 1

INVENTOR
Oliver K. Kelley
BY Willits, Helmig & Baillio
ATTORNEYS

March 3, 1959  O. K. KELLEY  2,875,643
TRANSMISSION CONTROL SYSTEM

Filed Dec. 3, 1952  8 Sheets-Sheet 6

INVENTOR
Oliver K. Kelley
BY
Willits, Helwig & Baillie
ATTORNEYS

March 3, 1959 O. K. KELLEY 2,875,643
TRANSMISSION CONTROL SYSTEM
Filed Dec. 3, 1952 8 Sheets-Sheet 7

INVENTOR
Oliver K. Kelley
BY
Willits, Helwig & Baillo
ATTORNEYS

March 3, 1959

O. K. KELLEY 2,875,643

TRANSMISSION CONTROL SYSTEM

Filed Dec. 3, 1952

INVENTOR
Oliver K. Kelley
BY
Willits, Helmig & Baillio
ATTORNEYS

United States Patent Office 2,875,643
Patented Mar. 3, 1959

2,875,643

TRANSMISSION CONTROL SYSTEM

Oliver K. Kelley, Birmingham, Mich., assignor to General Motors Corporation, Detroit, Mich., a corporation of Delaware Application December 3, 1952, Serial No. 323,801

23 Claims. (Cl. 74—645)

This invention relates to transmissions and control systems therefore, and particularly to a control system for an automatic transmission of the type incorporating a torque converter and planetary gearing unit driven by the torque converter. The transmission for which the hereinafter described control system is designed is, subject to the control thereof by means of various clutches and brakes, arranged to provide for neutral or no drive, reverse, and to transmit power in three stages in forward drive. In the first stage the fluid unit acts as a torque converter, in the second stage as a fluid coupling, and in the third stage power is transmitted directly through the transmission by means of a mechanical lock-up clutch.

The transmission unit for which the control system of this disclosure is designed is fully shown and described in my co-pending application for United States Letters Patent Serial Number 128,278 filed November 19, 1949, and is shown schematically in Figure 1 of this application. The transmission includes in its control mechanism a direct drive lock-up clutch, a neutral clutch, a reverse brake, and a low gear brake. It is to the various features of the control system for actuating these various transmission servo operated brakes and clutches that this specification is directed.

An object of this invention is to provide in a transmission control system, means responsive to an engine throttle control and also responsive to vehicle speed for regulating the pressure level of fluid pressure supplied to the transmission control servos.

Another object of this invention is to provide in a transmission control system, valve means for varying the pressure at which oil leaves the torque converter in a series of phases as determined by the position of the transmission shift selector lever.

A further object of this invention is to provide in a transmission control system of the class described, valve means for preventing upshift in low range at vehicle speeds below a predetermined vehicle speed and effective to permit upshift at vehicle speeds above said predetermined vehicle speed.

An additional object of this invention is to provide in a control system of the class described, a direct drive clutch hydraulically connected to the pressure existing in a torque converter together with a pressure regulator valve subject to control of both governor pressure and line pressure supplied to transmission servos for regulating the pressure level of fluid pressure in said torque converter and upon the direct drive clutch piston to bias the direct drive clutch towards its released position.

Another object of this invention is to provide in a transmission control system a manually operable selector valve, a coast valve and a shift valve wherein the coast valve is biased by line pressure under control of the selector valve in one position of the selector valve to admit governor pressure from a vehicle speed responsive governor to the shift valve, and wherein line pressure is cut off from the coast valve in another position of the selector valve to permit the coast valve to block off governor pressure from the shift valve.

These and other objects and advantages of this invention will be apparent from the following description and claims, taken in conjunction with the accompanying drawings in which:

Figure 1:
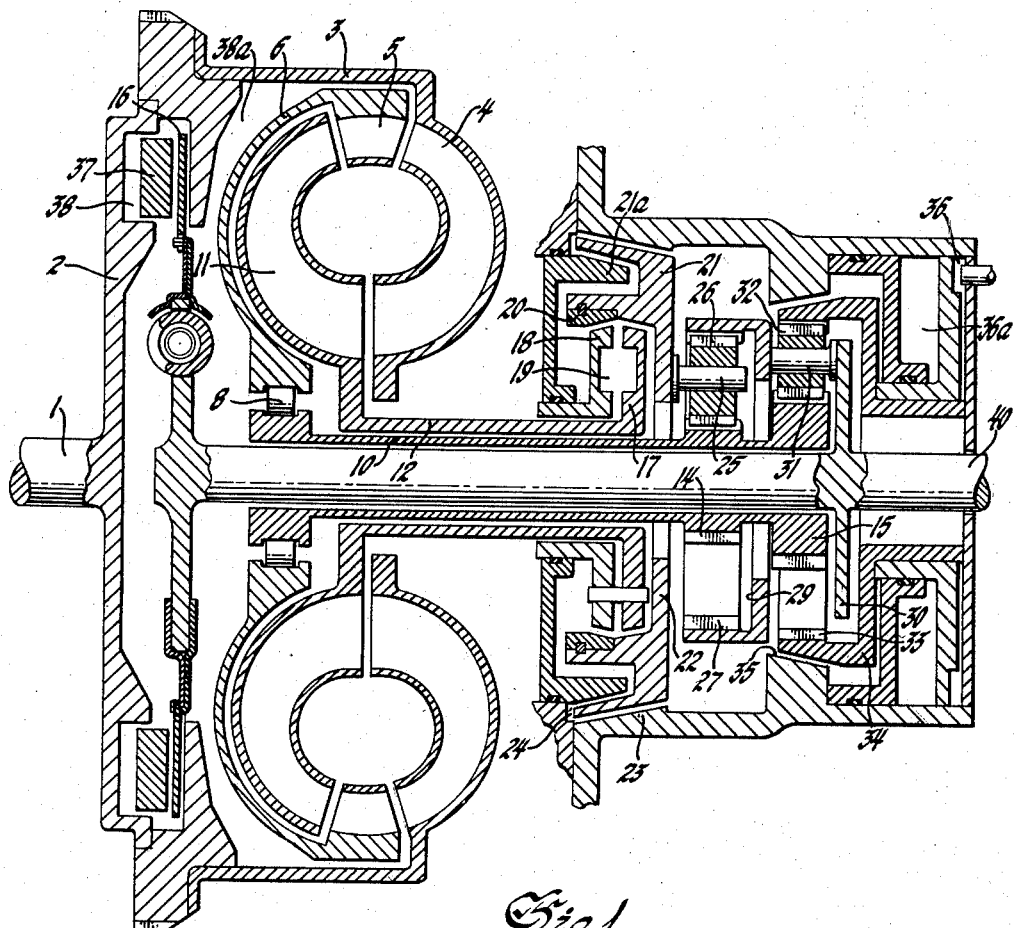
Figure 1 is a schematic diagram of the transmission to be controlled.

Referring to Figure 1, there is shown, schematically, a transmission unit as disclosed and fully described in my aforementioned co-pending application for United States Letters Patent Serial Number 128,278, filed November 19, 1949. The transmission unit consists primarily of a torque converter unit having an impeller or pump 4 connected directly to an engine driven shaft 1 through a flywheel 2 and a drum 3. A first turbine member 5 is connected to a shaft 10 by means of a drum 6, there being a one-way clutch 8 between shaft 10 and drum 6. A second turbine member 11, which may act as a reaction member under some drive conditions and as a fluid coupling member under other drive conditions, is connected to a shaft 12. Shaft 10 has attached thereto a pair of sun gears 14 and 15 and a direct drive clutch plate 16. Shaft 12 carries a clutch member 17, there being a clutch member 18 adapted to engage a clutch surface 20 when fluid pressure is admitted to chamber 19 between the members 17 and 18. Clutch surface 20 is carried by a drum 21 secured to a planet carrier 22. Drum 21 is movable axially to contact a fixed housing 23 when fluid pressure is admitted to a chamber 24. Drum 21, therefore, acts as a pressure responsive member movable axially to engage housing 23 during reverse condition of operation when fluid pressure is admitted to chamber 24 to brake the planet carrier 22. A stub shaft 25 supported on carrier 22 rotatably supports plurality of planet gears 26 in mesh with sun gear 14 and a ring gear 27.

Ring gear 27 is supported by an extension 29 of a planet carrier 30 fixed to final output or load shaft 40. A stub shaft 31 supported in carrier 30 rotatably supports a plurality of planet gears 32 meshed with sun gear 15 and a ring gear 33. Ring gear 33 is carried by an axially movable member 34 and is adapted to engage housing member 35 when fluid pressure is admitted to chamber 36 to prevent rotation of ring gear 33. That is, member 34 is axially movable when fluid pressure is admitted to chamber 36 to engage brake member 34 to housing 35. A chamber 36a at the opposite side of member 34 is provided to receive fluid pressure to release the low gear brake. A piston 37 is adapted to engage direct drive clutch 16 when fluid pressure is admitted to chamber 38. Fluid pressure existing in the torque converter is permitted to pass through a passage 38a to the space adjacent clutch plate 16, this pressure tending to hold the direct drive clutch released when fluid pressure is exhausted from chamber 38.

Complete structural details of the transmission unit are fully described in my co-pending application heretofore identified and it is accordingly not believed necessary to describe all of these details in the present application.

A brief description of the various operating phases of the transmission unit follows.

Neutral

In neutral, all clutches and brakes are released, all of the clutches and brakes being exhausted to the transmission sump. Impeller 4 rotates at engine speed. Turbine 5 and reaction member 11 also rotate at or near engine speed. Since the sun gears 14 and 15 are directly connected to member 10 and to member 6 through the one-way clutch 8, the planet gears 26 and 32 are caused to rotate on their stub-shafts 25 and 31, respectively. As no member of the planetary gear train is restrained from motion, no motion is imparted to load shaft 40. Because the front ring gear 27 and rear unit planet carrier 30 are both connected to output shaft 40 they are held stationary and the rotation of planet gears 26 and 32 causes the front unit planet carrier 22 and the rear unit ring gear 33 to rotate about their axes.

Stall

At stall both the neutral clutch 18 and low gear brake 34 are applied, the transmission is in low gear, and due to the load applied to members 5 and 11, these members are held stationary. The impeller 4 is trying to drive turbine 5, and turbine 5 in turn is trying to drive the sun gears 14 and 15 through the one-way clutch 8. Turbine 11 acts as a torque reaction member for turbine 5 and tends to rotate backwards, but is unable to do so since it is locked to the planetary gear train through the neutral clutch 18.

Torque converter range

The power flow in torque converter range is through the impeller 4, through turbine 5, one-way clutch 8, back through the sun gear shaft 10 and planetary gear train to output shaft 40.

Part of the power flow is diverted from the planetary gear train through the front unit carrier 22 and the neutral clutch 18 to turbine 11. Since the rear ring gear 33 is held stationary by the application of the low gear brake 34, it acts as the reaction member in the planetary gear train. As the speed of rotation of turbine 5 approaches that of impeller 4, turbine 11 picks up the load.

Fluid coupling range

In the fluid coupling range, turbine 11 is transmitting all of the engine torque, driving through the neutral clutch 18 and front planet carrier 22. Turbine 11 never multiplies torque but acts as fluid coupling member. Turbine 5 in this stage of operation is free-wheeling. Turbine 11 is unable to drive turbine 5 through the carrier 22 and sleeve 10 because one-way clutch 8 automatically disconnects turbine 5 from shaft 10 whenever shaft 10 rotates faster than turbine 5.

Direct drive

With the manual selector lever in the "drive" position, and after the vehicle has attained a predetermined speed which may, for example, vary between 18 miles per hour for light throttle and up to 65 miles per hour for full throttle, an upshift occurs. This is effected by application of the direct lock-up clutch 16 and release of the low gear brake 34. Engine power is then transmitted directly to the output shaft 40.

Reverse

When the manual selector lever is placed in reverse position, the reverse brake 21 is applied and the low gear brake 34 is released. The neutral clutch 18 is also applied. This brakes the front unit planet carrier 22 and reverses the motion of output shaft 40. Because turbine 11 is connected to the front unit planet carrier 22 through neutral clutch 18, it is also held stationary and acts as a torque reaction member for turbine 5.

The power flow in reverse is through impeller 4, through turbine 5 and one-way clutch 8, back along sun gear shaft 10 to the planetary gear train 14, 26, 27 and from there to output shaft 40.

Over-run braking—low gear

A positive down-grade engine braking is accomplished by a downshift to low range position with a closed throttle. This over-run braking is accomplished in two distinct operational phases which depend upon the vehicle road speed.

In the speed ranges of zero to 10 miles per hour and above a predetermined speed, for example 35 miles per hour, the engine braking is provided through the planetary gear train reduction. The transmission is in low gear with low gear brake 34 and neutral clutch 18 applied. Turbine 11 is driven through the planetary gear train at a speed greater than that of the output shaft speed. This causes turbine 11 to act as a pump and reverses the oil flow in the converter. Impeller 4 becomes the driven torus of a fluid coupling and the engine is driven at the speed of turbine 11, less slippage in the converter. This slippage is rather high, especially in the low speed range, due to the inefficient coupling characteristics with the reverse flow of oil. As the power output shaft 40 becomes the power input shaft in over-run braking, the one-way clutch race attached to shaft 10 is turning at a higher speed than turbine 5 so that turbine 5 is caused to free wheel.

In the speed range between 10 and 35 miles per hour with closed throttle, the direct lock-up clutch 16 is automatically applied and the engine and impeller 4 are driven at output shaft speed. Since turbine 11 is now turning at a speed greater than the impeller speed, a churning is created in the converter. The act of simultaneously driving both the impeller 4 and turbine 11 by the output shaft 40 creates a large degree of churning of the working fluid in the fluid unit with the energy absorbed being dissipated in the form of a heat loss. This may be termed churn braking. The direct lock-up clutch 16 is released the moment the accelerator pedal is depressed.

The hydraulic control system whereby the various clutches and brakes of the transmission are actuated to accomplish the heretofore described mode of operation will now be described in detail. The hydraulic control system consists primarily of the following elements shown in combination in Figures 2 through 5:

(1) Front and rear oil pumps 41 and 42 which supply oil pressure for servo actuation and transmission lubrication.

(2) Pressure regulation valve 50 which controls line pressure.

(3) Throttle valve 75 which controls the line pressure build-up in the regulator valve 50 and also controls other valves.

(4) Governor 91, which controls line pressure drop in pressure regulator valve 50 and also controls other valves.

(5) Shift valve 115, which controls the points at which upshift or downshift takes place through the release or application of direct drive clutch 16 and the low gear drive brake 34, and neutral clutch 18. The shift valve 115 is operated by throttle, governor, and spring pressures.

(6) Manual valve 130, which controls the flow of oil to the various valves and clutches.

(7) Converter valve 155, which controls the pressure in the converter and also directs the flow of oil from the converter to the cooler.

(8) Downshift detent valve 180, which controls the manual or forced downshift.

(9) Coast valve 191, which prevents upshift in low range of operation except during over-run braking, or in reverse.

(10) Lubrication valve 205 which regulates the flow of lubrication to different parts of the transmission.

(11) Front and rear pump shuttle valves 111 and 112, which prevent the back-flow of oil.

(12) Check valve 215, which prevents a sudden drop in the line pressure when the throttle valve pressure is removed.

The front and rear oil pumps 41 and 42 supply hydraulic pressure for the entire control system and for transmission lubrication. Pump 41 is engine driven and pump 42 is driven by the transmission output shaft and operates when the vehicle is moving regardless of whether the engine is running or not. The rear pump supplies pressure in the event that the vehicle is being towed to start the engine.

The hydraulic control system operates on a line pressure that may vary from 50 to 150 pounds per square inch, depending on engine throttle opening and vehicle car speeds. Since the clutches and brakes of the transmission are applied by line pressure, the pressure level required to operate the servos depends upon torque load. To meet these varying requirements the line pressure is regulated so that its curve approximately parallels the torque converter pressure output curve. This reduces horsepower losses as the rear pump 42 works against lower pressures at higher speeds. The minimum pressure required is determined by the minimum pressure required to apply the clutches and brakes at zero engine throttle. The maximum value of the system pressure is determined by the pressure required to apply the clutches and brakes under stall conditions wherein maximum torque is being applied to the transmission.

The relationship of the various valves and elements of the control system with respect to each other is shown in Figures 2 through 5. Before describing the over-all operation of the control system, the various elements will be individually described.

Regulator valve

Figure 6:
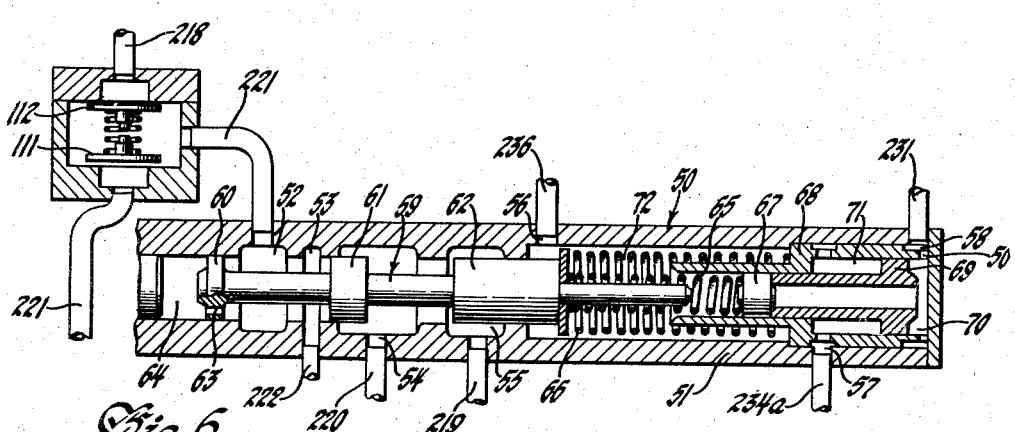
Figure 6 is a schematic diagram illustrating the features of construction of the line pressure regulator valve.

The pressure regulator 50, shown in detail in Figure 6, is used to regulate the system line pressure, the pressure delivered by valve 50 being a function of the throttle opening and vehicle speed. Valve 50 consists of a casing 51 having seven ports 52, 53, 54, 55, 56, 57, and 58 therein. A pressure regulator valve body 59 includes three lands 60, 61 and 62 joined by reduced stem sections. An orifice 63 is drilled through land 60 to admit pump pressure from passage 221 to a chamber 64 at the end of the valve body 59. A pair of springs 65 and 66 bear against land 62, tending to move the valve body to the left, as viewed in Figure 6. Spring 65 seats upon a piston 67, while spring 66 seats upon a piston 68. Port 52 connects to pump delivery passage 221. Port 53 is connected to the torque converter to supply pressure to the torque converter by way of a passage 222. Port 54 connects to the engine driven pump 41, pump pressure being supplied to port 54 by way of a passage 220. Port 55 connects to the suction side of the engine driven pump 41 or to sump through passage 219. Port 56 connects to passage 236 leading to the manual control valve and to a valve for regulating the pressure of fluid leaving the converter. Port 57 connects to a governor pressure delivery passage 234a, and port 58 connects to a throttle valve pressure delivery passage 231. Piston 69 is drilled axially so that pressure in chamber 70 is permitted to act upon piston 67. A chamber 71 intermediate pistons 68 and 69 receives governor delivered pressure from the transmission governor by way of passage 234a.

The minimum line pressure of 50 pounds per square inch is controlled by the regulator spring 66. Pressures above 50 pounds per square inch are controlled by regulator spring 66 and throttle pressure, or the regulator spring 66 and a combination of throttle and governor pressure acting upon the regulator valve. Generally line pressure builds up as throttle pressure acting in chamber 70 increases and falls off as governor pressure in chamber 71 increases. Thus, governor pressure, which increases with vehicle speed, and throttle valve pressure, which increases as the vehicle throttle is moved from a throttle closing to a throttle opening position, exert opposing forces upon piston 69 to regulate the line pressure supplied to the system.

When the engine is started, the front pump 41 operates to direct oil pressure to the regulator valve housing through port 52. This oil flows through orifice 63 in land 60 to chamber 64 behind the valve. As pressure in chamber 64 is built up, valve body 59 is forced against spring 66. After pressure has built up to 50 pounds per square inch, valve port 53 is uncovered and pressure above the amount required to maintain this pressure is metered through passage 222 to the torque converter. It is necessary that the line pressure be built up to the minimum of 50 pounds per square inch for control system requirements before the converter is filled with oil.

As the driver depresses the vehicle accelerator pedal, a linkage (not shown) operates a throttle valve 75 (see Figure 7) and throttle pressure is built up. This pressure is directed to chamber 70 through passage 231 and port 58. Pressure behind pistons 67 and 69 forces piston 67 against spring 65 until the line pressure in chamber 70 behind land 69 is balanced by the regulator spring 66 and the throttle pressure.

As the engine speed increases, the flow of oil is also increased. When the rate of flow of oil exceeds the converter requirements, pressure in chamber 64 and acting upon land 60 builds up so that the valve body moves until port 55 is opened. Port 53 then ceases to act as an orifice and the rate of flow of oil through port 53 is determined by the pressure of oil flowing out of the converter. This permits excess oil that cannot exhaust through port 53 to circulate into the regulator valve housing through port 54 and out through port 55 back to the suction side of the engine driven pump 41.

When the vehicle moves forward the rear pump 42 begins to build up pressure in passage 218 against a shuttle valve 112 until this pressure equals the front pump pressure. Both pumps then supply oil. The amount of oil supplied by the engine driven pump 41 is the difference between the converter requirements and the oil supplied by the rear pump. As the vehicle speed increases, the rear pump 42 of oil flow increases and exceeds the converter requirements. The rear pump then closes off the front pump shuttle valve 111 and the front pump is by-passed through ports 54 and 55 of valve 69. The resultant pressure build up of pressure in chamber 64 moves valve body 59 until excess oil from port 52 is exhausted through port 55.

As was mentioned heretofore, line pressure falls off as the governor pressure acting in chamber 71 increases with vehicle speed. It is necessary to prevent the line pressure from dropping to the minimum of 50 pounds per square inch for any throttle opening, because that pressure is inadequate for certain shift functions when the vehicle engine throttle is partially opened. Both of these functions are met by the so-called booster unit made up of pistons 67 and 69. Piston 67 is acted upon by throttle pressure only. Piston 69 is acted upon by the opposing forces of throttle and governor pressure. The throttle pressure acting upon piston 69 is transmitted through piston 67. The governor pressure in chamber 71 opposes the throttle pressure so that its effect is to reduce the throttle-pressure load-transfer from the booster unit 70a to the valve 59, with consequent reduction of line pressure. When the governor pressure balances or exceeds the throttle pressure acting upon piston 69, only the piston 67 transmits the throttle pressure. The piston 67 thus prevents the line pressure from dropping to 50 pounds per square inch when any throttle opening exists.

When the manually operable selector valve 130 of Figures 2 through 5 is in the "low" position, governor pressure is also directed to chamber 72 through passage 236 and port 56. The effect of this pressure is to increase the line pressure maintained in passage 221. This increase is necessary to provide sufficient pressure to keep the low gear brake applied during over-run braking.

Throttle valve

Figure 7:
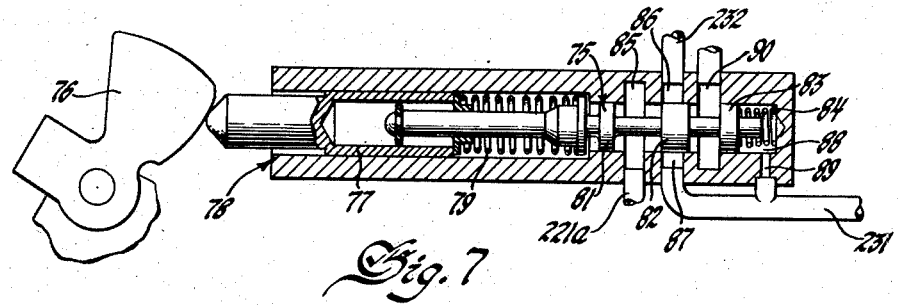
Figure 7 is a schematic diagram of the accelerator pedal controlled throttle valve.

The throttle valve 75 of Figure 7 is operated by a cam 76 controlled by any suitable linkage, (not shown), connecting cam 76 to the vehicle accelerator pedal, (not shown). The arrangement is such that throttle valve delivers a metered pressure which increases with increase of engine throttle opening. Throttle valve pressure is directed through passage 231 to the pressure regulator valve 50 to control the line pressure build up, to a so-called detent valve 180 (see Figure 12) through a passage 232, to a coast valve 191 (see Figure 13) through passage 231 and to shift valve 115 (see Figure 9) through passage 231. Valve plunger 77 in housing 78 is actuated by cam 76, the movement of cam 76 being coordinated, through a linkage system, (not shown) to the movement of the vehicle accelerator pedal. A spring 79 is interposed between plunger 77 and valve 75 composed of lands 81, 82, and 83. A so called kick-off spring 84 is disposed between one end of the valve and valve casing 78. Pump line pressure in passage 221a is admitted between lands 81 and 82 by a port 85. Port 86 connects to passage 232 leading to a detent valve 180. Port 87 connects to passage 231 leading to port 58 of pressure regulator valve 50, to a port 200 of a coast valve 191, and to a chamber 118 of a shift valve 115. Throttle valve delivery passage 231 is also connected to a chamber 88 adjacent spring 84 through a restricting passage 89.

When the vehicle accelerator pedal is depressed, cam 76 forces plunger 77 against spring 79 to cause valve 75 to deliver pressure to passages 231 and 232. Pressure from passage 231 flows into chamber 88 adjacent spring 84, this pressure forcing valve 75 against spring 79 to close off ports 86 and 87. As the throttle is moved toward its open position cam 76 exerts greater force against spring 79 to cause the valve 75 to deliver pressure to passages 231 and 232. In this manner, the valve 75 is balanced between throttle pressure delivered by the valve and spring force. Pressure delivered by the valve increases as cam 76 forces plunger 77 into the valve casing. This occurs when the engine throttle is moved from a throttle closing to a throttle opening position. Port 90 exhausts to the transmission sump.

Governor

Figure 8:
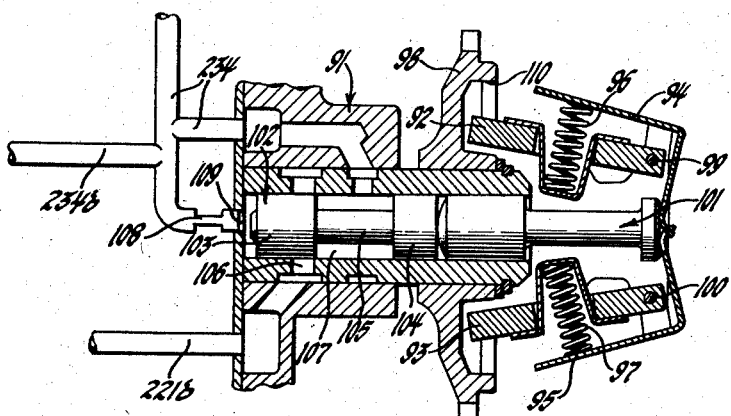
Figure 8 is a schematic diagram illustrating the vehicle speed responsive governor.

The governor 91 of Figure 8 regulates the line pressure drop in the pressure regulator valve, and controls the operation of the shift valve 115, coast valve 191, and the low range of the converter valve 155. The governor consists primarily of weights 92 and 93, levers 94 and 95, springs 96 and 97, and governor body 98. Governor body 98 is geared to be rotated by the transmission power output shaft and is responsive to vehicle speed. Lever 94 and weight 92 are pivoted for rotation about point 99 as a center, while weight 93 and lever 95 pivot about point 100 as a center. Both levers 94 and 95 act against the end of a plunger 101 which, in turn, operates a valve 102. Valve 102 consists of lands 103 and 104 joined by a reduced stem section 105.

When the governor revolves, the centrifugal force of weights 92 and 93 acting upon levers 94 and 95 through springs 96 and 97, respectively, moves valve 102 until port 106 admits pressure from line pressure supply passage 221b to chamber 107. This pressure flows through an orifice 108 to a chamber 109 at one end of the valve. Governor pressure in chamber 109 is balanced by centrifugal force acting through levers 94 and 95, and the pressure is regulated to increase with increase of vehicle speed.

The governor acts in two stages. In the primary stage, the weights 92 and 93, springs 96 and 97, and levers 94 and 95 act as a governor weight unit, because the springs are so preloaded that the relative position between the levers and weights is maintained. After a predetermined car speed, for example, 30 miles per hour, has been attained, weights 92 and 93 move out against springs 96 and 97 to contact a stop member 110. The levers 94 and 95 now become the governor weights and continue to regulate the governor pressure in passages 234 and 234b upwards as the speed increases, but at a lower rate of increase than in the primary stage. The relatively high rate of governor pressure build-up in the primary stage makes it possible to obtain a wide spread of vehicle speed between the points at which upshifts or downshifts occur. The lower rate of change of pressure build-up in the secondary stage permits the calibration of shift point spread to extend to higher car speeds.

Shift valve

Figure 9:
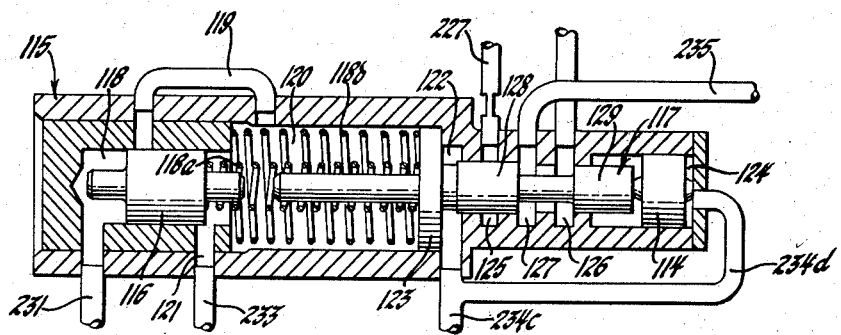
Figure 9 is a schematic diagram of the shift valve.

The shift valve shown in Figure 9 is operated by throttle and governor pressures. The function of the shift valve is to automatically control the timing of the shifts. The upshift from fluid coupling range to direct drive preferably occurs at car speeds of from approximately 18 miles per hour at zero throttle pressure up to approximately 47 miles per hour at full throttle pressure. The downshift from direct drive to either fluid coupling range or torque converter range preferably occurs at vehicle speeds of from 21 miles per hour at full throttle pressure down to approximately 15 miles per hour at zero throttle pressure.

As shown in Figure 9, the shift valve 115 is made up of a modulator plug 116, a valve body 117, a governor plug 114, a spring 118a interposed between modulator plug 116 and valve 117, and a spring 118b placed between the valve casing and land 123 of valve 117. Throttle valve pressure is admitted from passage 231 to a chamber 118. A passage 119 admits throttle pressure from chamber 118 to a chamber 120 when uncovered by modulator plug 116. Port 121 is connected by passage 233 to port 183 of downshift valve 180. A governor pressure delivery passage 234c, controlled by a coast valve 191, may conduct governor pressure to a chamber 122 adjacent a land 123 of the shift valve and to a chamber 124 adjacent a governor plug 114 through branch passage 234d. Line pressure delivery passage 227 conducts pump line pressure to a port 125. Port 126 exhausts to the transmission sump, and port 127 connects to passage 235 leading to direct drive clutch chamber 38 and port 148 of manually operable selector valve 130.

In Figure 9, shift valve 115 is shown in its downshift position. When the accelerator pedal is depressed and the vehicle moves forward, throttle pressure is directed through passage 231 to chamber 118 at one side of modulator plug 116, and governor pressure in passage 234c is directed to chamber 122 adjacent large land 123 of shift valve 115, and also to chamber 124 beneath governor plug 114 through passage 234d. The throttle pressure acting upon modulator plug 116 is transferred through spring 118a against the valve, opposing the effect of governor pressure on governor plug 114. As the throttle pressure increases, it moves modulator plug 116 to open passage 119, permitting modulated throttle pressure to meter into the spring chamber 120. This pressure, called modulator pressure, then works against land 123 to oppose governor pressure, and also against the modulator plug 116 to oppose the throttle pressure. As the modulator pressure builds up, it, together with spring 118a, moves the modulator plug to close off passage 119. The modulator pressure equals the throttle pressure less the force of spring 118a.

If the throttle is slightly opened, throttle pressure will be low and governor pressure will shift the shift valve 115 at low car speed. If the throttle is opened wide, a greater car speed will be required to build up sufficient governor pressure to overcome the effect of throttle pressure, therefore the transmission will upshift at a higher car speed. Upshift occurs when valve 115 is moved to admit line pressure from passage 227 to passage 235. Land 128 of shift valve 115 is of greater diameter than land 129 so that pressure in passage 235 will react upon the shift valve to help maintain the valve in its upshift position once the valve has moved to admit pressure to passage 235. On downshift, pressure in passage 235 is exhausted through port 126.

In addition to the normal upshift and downshift heretofore described, a so-called forced downshift is available to the driver. This is a manually controlled downshift to low range for rapid acceleration and is controlled by means of a downshift detent valve 180 (see Figure 12) by depressing the accelerator to the floorboards. The manual or forced downshift may be accomplished at vehicle speeds of from approximately 20 to 60 miles per hour. When the vehicle accelerator pedal is depressed to the floorboards, downshift detent valve 180 is caused to admit throttle valve pressure to passage 233 and to chamber 120 where it acts upon large land 123 of the shift valve 115. The throttle pressure in chamber 118 that normally acts upon modulation plug 116 is now fully balanced by the throttle pressure acting on the opposite end of the modulator plug in spring chamber 120. The area of land 123 is so calibrated that the throttle pressure acting upon it is sufficient to overcome the effect of governor pressure to cause downshift.

When the manually operated drive range selector valve 130 (see Figure 10) is placed in the "low" position, the shift valve 115 remains in the downshift position except during the churn braking period of over-run braking heretofore described. This is so because the governor pressure in passage 234c is blocked off from the shift valve by the coast valve 191 (see Figure 13). In overrun braking between vehicle speeds of approximately 18 to 35 miles per hour, where churn braking occurs, the coast valve 191 directs governor pressure through passage 234c to the shift valve 115. The governor pressure then causes the shift valve 115 to upshift to direct pressure from passage 227 to passage 235 to apply the direct drive clutch 16. The valve 130 directs pressure from passage 221c to passage 227 to apply the low gear brake during churn or overrun braking.

*Manual selector valve*

Figure 10:
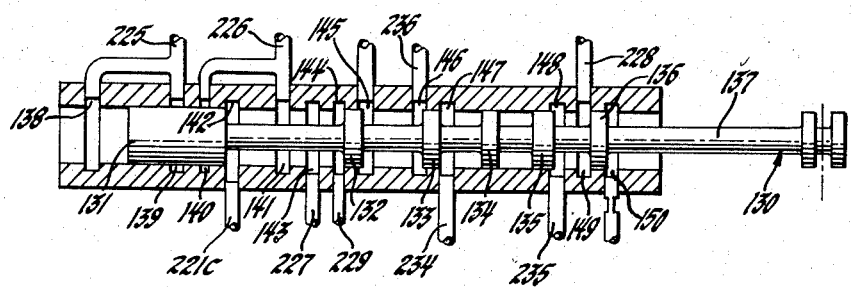
Figure 10 is a schematic diagram of the manually operable selector valve.

The function of the selector valve 130 of Figure 10 is to control the oil flow to various valves, clutches and brakes of the hydraulic system. The valve is operated by a lever that is connected through linkage (not shown) to the transmission shift selector on the vehicle steering column. The valve 130 may be positioned for park, neutral, drive, low and reverse. The selector valve opens or closes connecting passages between other valves and clutch or brake servos, thus permitting oil pressure to be applied or removed as required for the automatic operation of the transmission for the condition selected by the vehicle operator.

The valve body of valve 130 is made up of six lands 131, 132, 133, 134, 135, and 136 formed on or stem 137. The valve casing is provided with thirteen ports. Ports 138 and 139 connect to the reverse brake pressure supply passage 225, the port 138 exhausting to the transmission sump. Ports 140 and 141 connect the valve bore to neutral clutch pressure supply passage 226. Port 142 admits pump line pressure from passage 221c to the valve bore. Port 143 connects the valve bore to passage 227 leading to the shift valve and low gear brake servo. Port 144 connects to passage 229 leading to the converter and coast valves. Port 145 exhausts to sump. Port 146 connects to passage 236 leading to the converter and pressure regulator valves. Port 147 connects to passage 234 leading to the governor. Port 148 connects to passage 235 leading to the shift valve and direct clutch servo. Port 149 connects to passage 228 leading to the low gear servo release chamber 36a and to the downshift valve 180. Port 150 exhausts to sump.

*Converter valve*

The converter valve 155 regulates the pressure at which oil leaves the converter (termed converter discharge pressure) and the flow of oil to the cooler. It regulates the converter discharge pressure in three different phases depending upon the position of the selector valve 130.

In park, neutral or reverse, the converter valve regulates the converter discharge pressure at approximately 25 pounds per square inch below the pump line pressure. This pressure drop through the converter insures adequate oil flow to cool the oil when the engine is running. The converter discharge pressure acts behind the direct clutch piston 37 and is sufficiently high to prevent the centrifugal force of the trapped line pressure oil in the piston from applying the clutch at high engine speeds.

Figure 11:
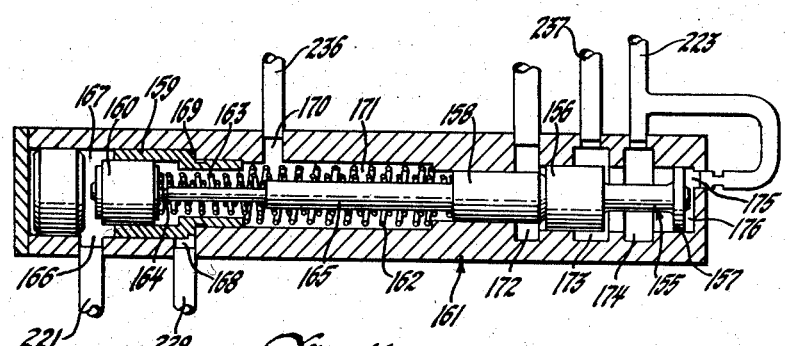
Figure 11 is a schematic diagram of the converter valve for controlling the pressure level of fluid pressure in the torque converter.

The converter valve 155 of Figure 11 is made up of a pair of lands 156 and 157, a valve pin 158, a booster sleeve 159, and a booster plug 160 disposed in a casing 161. An outer valve spring 162 acts upon booster sleeve 159 and an inner valve spring 163 acts upon booster plug 160. A so-called initial valve spring 164 seats on a boss 165 of valve pin 158 and acts upon booster plug 160. Line pressure supply passage 221 conducts pump line pressure to chamber 167 through port 166. Passage 229 connects port 168 and chamber 169 adjacent booster sleeve 159 to the manual valve 130. Port 170 connects valve spring chamber 171 to the manual valve by way of passage 236. Port 172 exhausts to the transmission sump. Port 173 connects to passage 237 leading to an oil cooler 240 (see Figure 2). Port 174 connects the space between lands 156 and 157 to the converter discharge passage 223. Port 175 admits pressure from passage 223 to chamber 176 beneath land 157.

Line pressure in chamber 167 behind the booster plug 160 is balanced by the converter discharge pressure in chamber 176 behind land 157 and the inner spring 163 is calibrated to give the equivalent of approximately 25 pounds per square inch pressure on the booster plug when the valve is in its regulating position. The effect of inner spring 163 is to subtract 25 pounds per square inch pressure from the line pressure to regulate the converter discharge pressure at 25 pounds per square inch less than line pressure. If the spring pressure on the booster plug builds up above 25 pounds per square inch, the valve opens and excess converter discharge pressure is exhausted to the cooler through port 173 and passage 237. The valve springs 162 and 164 do not affect the converter discharge pressure in this phase. This is because booster sleeve 159 on which outer valve spring 162 acts, has been forced by line pressure in chamber 167 to its extreme permissible position against spring 162, and booster 160 and pin 158, on which the initial valve spring 164 exerts pressure, are in contact and act directly upon each other.

Figure 2:
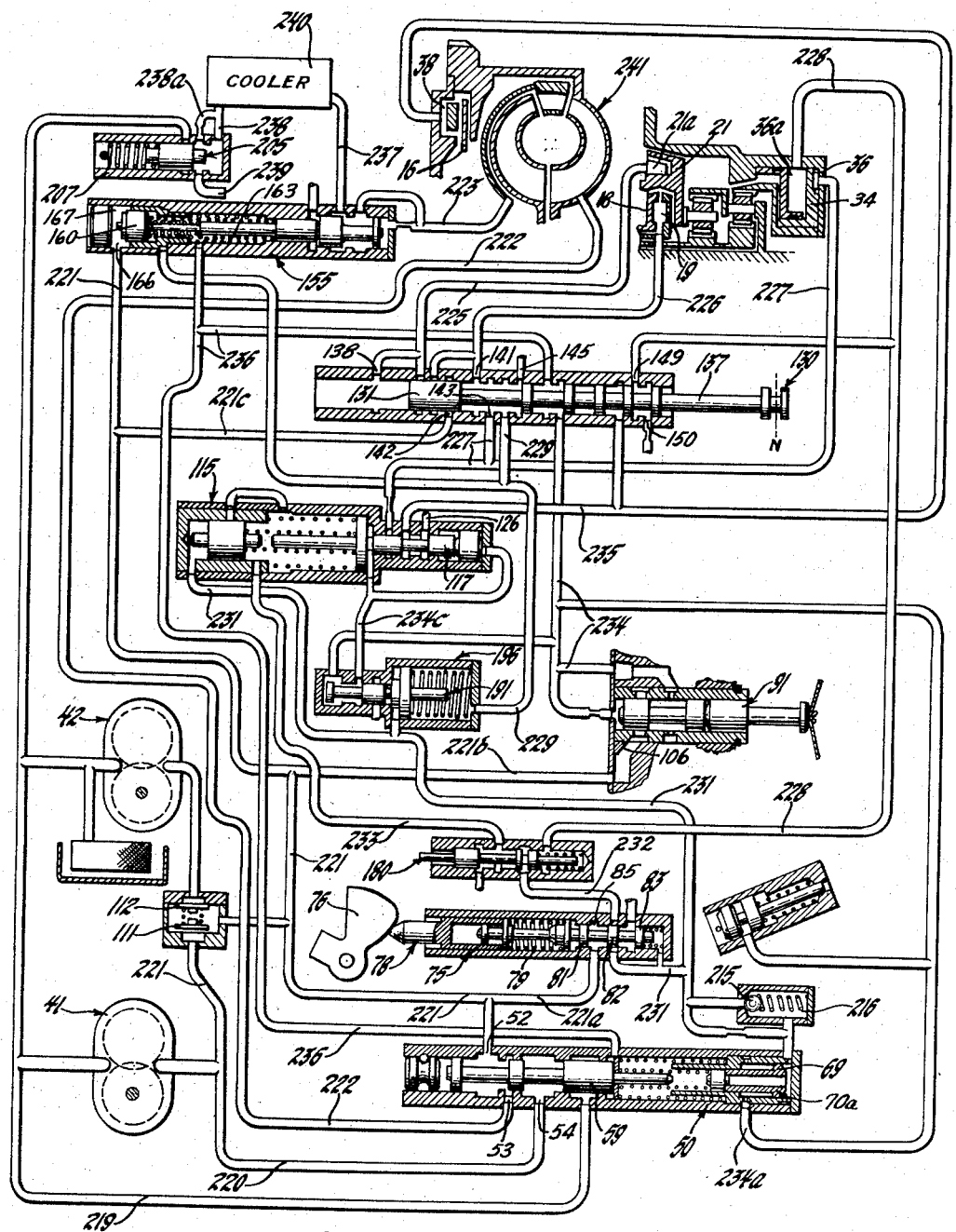
Figure 2 is a schematic diagram of the control system illustrating the system as conditioned for neutral or no-drive operation.

In the "drive" range position of the selector valve 130 of Figure 2, the converter valve regulates converter discharge pressure at a minimum of 10 pounds per square inch until the line pressure has built up to 75 pounds per square inch. This minimum converter discharge pressure is necessary to keep the converter filled with oil and to prevent cavitation at light throttle openings. As was stated earlier, the converter discharge pressure acts against one side of the direct-clutch piston 37, opposing the line pressure when it is acting upon the piston. At light throttle openings and low vehicle speed, the difference between the line pressure and the minimum converter discharge pressure is still sufficient to keep the direct clutch 16 applied after upshift has occurred. At line pressures above 75 pounds per square inch, the valve regulates the converter discharge pressure at 65 pounds below the line pressure, to provide sufficient difference between those pressures to maintain the direct clutch applied after upshift at higher throttle openings and higher car speeds.

In the phase of operation wherein the converter valve 155 regulates the converter discharge pressure at 65 pounds per square inch below the line pressure, the line pressure in chamber 167 behind booster plug 160 is balanced by the converter discharge pressure in chamber 176 and the inner and outer valve spring pressures acting upon the booster plug 160. Line pressure is directed against booster sleeve 159 at two places, the line pressure port 166 and the port 168 connecting to passage 229 leading from the manual valve 130. The two sleeve areas on which the line pressure is acting are of equal diameter and since the line pressure acts upon these two areas in opposite directions, the line pressure has no effect upon sleeve 159. Thus the pressure of the outer valve spring 162 is transmitted through the booster sleeve 159 to the booster plug 160. Outer valve spring 162 is calibrated so that its pressure, combined with that of the inner valve spring 163, exerts a pressure on the booster plug 160 equivalent to 65 pounds per square inch, when the converter valve is in its regulating position. Thus, the converter pressure is maintained at 65 pounds per square inch less than line pressure. If the combined spring pressures acting upon booster plug 160 build up to more than 65 pounds per square inch, the converter valve 155 opens and dumps excessive converter pressure to the cooler 240 (see Figure 2) through port 173 and passage 233.

If the line pressure falls to 75 pounds per square inch, the converter pressure is reduced to 10 pounds per square inch. If the line pressure is further reduced, the initial valve spring 164 begins to function. The inner and outer valve springs 163 and 162 then force the booster plug 160 away from valve pin 158 until the plug is finally forced to the end of its permissible range of movement in housing 161. At this point the line pressure ceases to have any effect upon the converter-discharge pressure. The initial valve spring 164 is calibrated so that, when booster plug 160 is moved to the end of its permissible range of movement and the converter valve is in its regulating position, spring 164 exerts a pressure on valve pin 158 equivalent to 10 pounds per square inch, thus insuring that the converter pressure never falls below that amount.

In the "low" range position of manually operable selector valve 130, the converter regulator valve regulates the converter pressure at a value that is equal to the line pressure less the inner valve spring pressure and less the effective governor pressure. The converter-discharge pressure is calibrated to provide a sufficient oil flow from the converter 241 to the cooler 240 to meet the cooling requirements in the "low" range. Except for the governor pressure effect wherein governor pressure from passage 236 is admitted to spring chamber 171, the same valve operating conditions prevail as in "neutral." Booster sleeve 159 is forced by line pressure to its limit of movement against spring 162 so that outer spring 162 does not affect the converter pressure. The same is true of the initial valve spring 164 because booster plug 160 and valve pin 158 act against each other. The two end areas of the booster sleeve 159 on which the governor pressure acts, that is, the end area of the booster sleeve on which the outer valve spring 162 is seated and the area behind the spring seat end of the booster plug, are of equal size. Since the governor pressure acts on these two equal areas from opposite directions, it has no effect upon the booster sleeve 159.

*Downshift detent valve*

Figure 12:
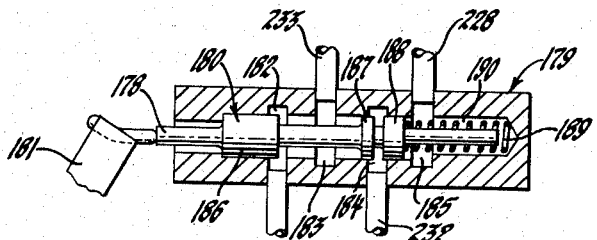
Figure 12 is a schematic diagram illustrating the details of the down-shift detent valve.

The function of the downshift detent valve 180 of Figure 12 is to direct throttle pressure into the spring chamber 120 of the shift valve 115 to cause a manual or forced downshift when this is desired. The valve is operated by a cam 181 that is connected to the same shaft that operates the throttle valve cam 76. Cam 181 is arranged to be effective only after the engine throttle has been almost completely opened, for example, during the last ten degrees of throttle opening.

Downshift detent valve 180 is made up of a housing 179 having four ports 182, 183, 184 and 185 therein. A valve body 180 made of lands 186, 187, and 188, is spring biased by a spring 189 to connect port 182 to port 183 and to block off port 184 from port 183. Port 182 exhausts to sump. Port 183 connects to passage 233 leading to chamber 120 of the shift valve. Port 184 connects the throttle pressure supply passage 232 and port 185 connects to line pressure supply passage 228. As the engine throttle is opened to the last ten degrees of throttle opening, cam 181 forces valve stem 178 into housing 179 until passage 232 is connected to passage 233. Throttle valve pressure then flows through passage 233 to spring chamber 120 of shift valve 115 to cause downshift at speeds below 60 miles per hour as heretofore explained in the description of shift valve 115.

Line pressure from passage 228 acts in chamber 190 against land 188 and offers a definite resistance "feel" to the accelerator pedal through the linkage system. Immediately after downshift occurs, line pressure in passage 228 is exhausted to sump through exhaust port 126 of shift valve 115, giving a "detent feel" to the accelerator pedal. Spring 189 forces the stem 178 against cam 181 at all times.

*Coast valve*

Figure 13:
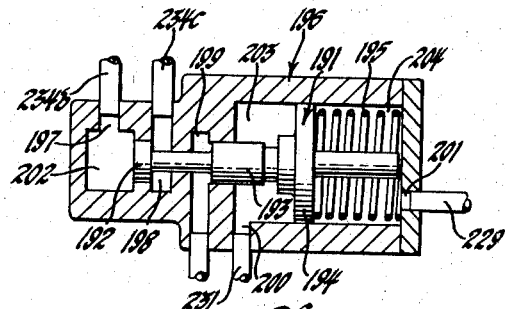
Figure 13 is a schematic diagram of the coast valve illustrating the coast valve as positioned to block off governor pressure from the control system shift valve.

The function of the coast valve of Figure 13 is to prevent upshift in low range, except during periods of overrun or churn braking.

Coast valve 191 is made up of lands 192, 193 and 194, the valve being spring biased by a spring 195. The valve housing 196 is provided with ports 197, 198, 199, 200 and 201. Governor pressure delivery passage 234b is connected to chamber 202 at one end of land 192 through port 197. Port 198 connects to passage 234c leading to chambers 122 and 124 of shift valve 115. Port 199 exhausts to sump. Throttle pressure from passage 231 is admitted to chamber 203 adjacent land 194 through port 200. Port 201 connects line pressure passage 229 to spring chamber 204 of the coast valve. The coast valve spring 195 and the areas of lands 194 and 192 are so calibrated that when any throttle pressure is present in chamber 203, or in over-run braking at vehicle speeds of 35 miles per hours or greater, the valve closes off governor pressure from the shift valve, thus preventing upshifting from taking place.

In over-run braking, when the vehicle speed is reduced to 35 miles per hour, spring 195 overcomes the effect of governor pressure acting upon land 192 and moves the valve to admit governor pressure from passage 234b to passage 234c. Governor pressure is then directed to chambers 122 and 124 of shift valve 115 and moves shift valve 115 to its upshift position to apply direct-drive clutch 16, causing churn braking. The shift valve 115 remains in its upshift position until a vehicle speed is reduced to 18 miles per hour when the shift valve is again moved to its downshift position, as explained in conjunction with the description of the shift valve. If, in the speed range between 18 and 35 miles per hour, the driver depressed the accelerator pedal, throttle pressure in passage 231 and chamber 203 moves coast valve 191 back to its position wherein governor pressure is blocked off from shift valve 115 and passage 234c is exhausted through ports 198 and 199, causing downshift to occur.

When the drive range selector valve 130 is placed in its "drive" position, the valve 130 directs line pressure to chamber 204 through passage 229. This line pressure, together with spring pressure is sufficient to overcome any combination of throttle and governor pressure acting on valve 191 so that the valve is always held in a position to admit governor pressure from passage 234b to passage 234c. Because the governor pressure then has unrestricted flow through the coast valve 191 to the shift valve 115, the coast valve 191 does not affect the shift valve functions during normal "drive range" driving conditions.

*Lubrication valve*

Figure 14:
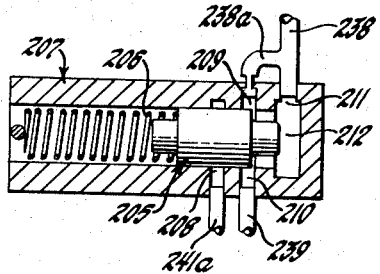
Figure 14 is a schematic diagram of a check valve for regulating the rate of discharge of throttle valve pressure from the line pressure regulator valve.

The function of the lubrication valve 205 of Figure 14 is to regulate lubrication oil pressure. The lubrication system operates on a normal oil pressure of approximately 3 pounds per square inch. The lubrication valve is made up of a valve member 205 and a valve spring 206 disposed in a housing 207. Housing 207 is provided with ports 208, 209, 210 and 211. Port 208 exhausts to sump. Port 209 connects to by-pass passage 238a branched from passage 238 leading from the system oil cooler 240. Port 210 is connected to lubrication supply passage 239, and port 211 connects chamber 212 to oil cooler discharge passage 238.

Oil pressure from the oil cooler is directed to chamber 212 behind valve 205 by way of passage 238. As the pressure is built up, pressure in chamber 212 forces the valve 205 against spring 206 until the passage 238 is connected to passage 239. If the pressure from the oil cooler builds up above 3 pounds per square inch, valve 205 moves against spring 206 to uncover exhaust port 208. Passage 241a may lead to the transmission sump or to the suction side of the system pump.

The purpose of by-pass 238a is to insure that a small amount of lubrication will always be available in the system in case the oil cooler pressure should fall below 3 pounds per square inch and thus be insufficient to move the valve 205 far enough to admit pressure to lubrication passage 239.

*Line pressure check valve*

Figure 15:
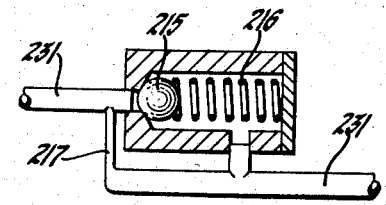
Figure 15 is a schematic diagram of a lubrication pressure regulator valve.

The function of the line pressure check valve 215 of Figure 15 is to prevent a sudden drop in the line pressure when the throttle pressure is removed and thus to cushion the release of the low gear brake in upshift. The line pressure check valve is positioned in the throttle valve discharge passage 231 and permits rapid flow of throttle pressure into the chamber 70 of pressure regulator valve 50, but when throttle pressure is reduced, the check valve closes so that discharge of throttle pressure from chamber 70 of line pressure regulator valve 50 is caused to pass through a restricting orifice 217. By reducing the rate of discharge of throttle pressure from chamber 70 of valve 50, sudden drops of line pressure, controlled by valve 50 are prevented.

The check valve is made up of a ball 215 loaded by a spring 216 to close off the valve. Throttle pressure in passage 231 is effective to open the check valve to permit unrestricted oil flow to chamber 70 of valve 50. When throttle pressure is reduced however, valve 215 closes, and discharge of pressure must be by way of restriction 217, thereby reducing the rate of discharge of pressure from chamber 70 of valve 50.

*Hydraulic control—neutral*

The hydraulic control system of Figure 2 shows schematically the assembled relationship of the various elements included in the hydraulic control system. With the manually operable drive range selector valve 130 in neutral and the engine started, engine driven pump 41 directs oil pressure to the ports 54 and 52 of pressure regulator valve 50 through passage 220, and through shuttle valve 111 and passage 221. Passage 221 is branched at 221a to connect to port 85 of throttle valve 75, branched at 221b to connect to port 106 of governor 91, branched at 221c to connect to port 142 of manual valve 130 and terminates at port 166 of converter valve 155. When pump output pressure has built up to 50 pounds per square inch, port 53 of regulator valve 50 is opened to admit pressure to passage 222 leading to the converter housing and this oil fills the converter.

The regulated pump pressure or line pressure acting in chamber 167 behind booster plug 160 of valve 155, together with the pressure of inner valve spring 163, regulates the converter discharge pressure in passage 223 at 25 pounds per square inch below the regulated line pressure. All of the clutches and brakes are held in the released position. The neutral clutch 18 and low gear and reverse brakes 34 and 21 are exhausted and held released by spring force. The direct clutch 16 is exhausted through passage 235 and exhaust port 126 of shift valve 115. Reverse brake 21 is exhausted through port 138 of the valve 130 by way of passage 225. Neutral clutch chamber 19 is exhausted through passage 226 and ports 141 and 145 of manually operated valve 130. Low gear brake chamber 36 is exhausted through passage 227 and ports 143 and 145 of valve 130. Low gear brake release chamber 36a is exhausted through passage 228 and ports 149 and 150 of selector valve 130. With the various clutches and brakes released, the transmission is in neutral.

*Hydraulic control—drive range—low gear*

In order to place the transmission in low range, the selector valve 130 must be placed in either "drive" or "low" position.

Figure 3:
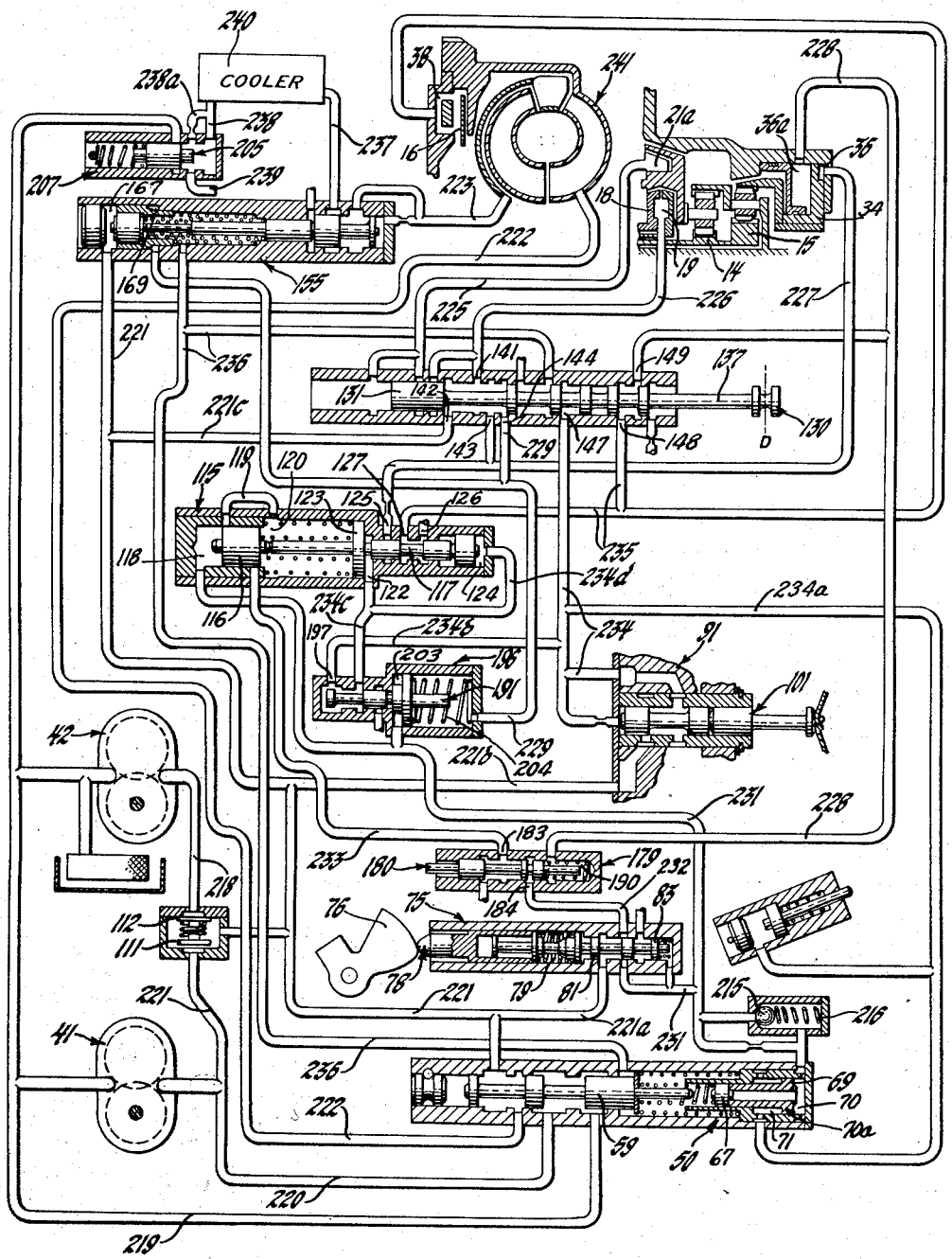
Figure 3 is a schematic diagram of the control system illustrating the control system as conditioned for drive range of operation.

With valve 130 positioned in drive range as shown in Figure 3, line pressure is permitted to flow to the neutral clutch piston chamber 19 to apply the neutral clutch and to the apply chamber 36 of the low gear brake piston 34. Line pressure is admitted to neutral clutch chamber 19 by way of passage 221c, ports 142 and 141 of selector valve 130 and passage 226. Line pressure is directed to the apply chamber 36 of low gear brake piston 34 by way of passage 221c, ports 142 and 143 of valve 130 and passage 227. The line pressure at these pistons applies the neutral clutch and low gear brake, putting the transmission in low range.

Line pressure is directed to chamber 167 of the converter valve 155 by way of passage 221. Line pressure is also directed to chamber 169 of the converter valve 155 by way of passage 221c, ports 142 and 144 of selector valve 130 and passage 229. The line pressure, acting in chambers 167 and 169 of the converter valve 155, combined with spring forces regulates the converter discharge pressure in passage 223 at 65 pounds per square inch below the line pressure or at a minimum of 10 pounds per square inch as heretofore explained.

When the engine throttle is opened and the vehicle moves forward, the load on the neutral clutch and low gear brake increases, and consequently the line pressure must be increased to keep them applied. This is accomplished through the effect of throttle pressure acting upon the regulator valve 50. More specifically, as the engine throttle is moved from a throttle closing to a throttle opening position, cam 76 causes throttle valve 75 to deliver a variable pressure which increases with engine throttle opening to passage 231 leading to chamber 70 of the pressure regulator valve 50. Throttle valve pressure acting upon piston 67 of the regulator valve causes the regulator valve 50 to increase line pressure as heretofore explained. Throttle pressure is also directed through passage 231 to chamber 203 of coast valve 191 and to chamber 118 of modulator plug 116 of shift valve 115.

Any decrease in engine torque decreases the load on neutral clutch 18 and low gear brake 34, and less pressure is necessary to maintain them applied. The decrease in line pressure is controlled by governor pressure acting in chamber 71 of the pressure regulator valve 50. Thus the throttle and governor pressure act in opposition to control the line pressure action of the pressure regulator valve. Governor pressure is delivered to chamber 71 of the regulator valve through passage 234 and branch passage 234a. Governor pressure is also delivered to port 147 of selector valve 130 through passage 234, to port 197 of coast valve 191 through passage 234b and to chambers 122 and 124 of shift valve 115 through passages 234c and 234d. Line pressure is delivered to chamber 204 of coast valve 191 and to chamber 169 of converter valve 155 through ports 142 and 144 of selector valve 130 and passage 229. Line pressure in chamber 204 of coast valve 191 holds the coast valve open, permitting free flow of governor pressure from passage 234b to passages 234c and 234d leading to chambers 122 and 124 of shift valve 115.

Throttle pressure in chamber 118 behind the modulator plug 116 of shift valve 115 is effective at throttle openings above 15° to move the modulator plug to admit modulator pressure to shift valve spring chamber 120 through passage 119. The throttle pressure, combined with shift valve spring pressure, below 15° throttle opening, or the throttle and modulator pressure (above 15° throttle opening) combined with the shift valve spring pressure, overbalance the opposing governor pressure in chambers 122 and 124 of the shift valve, and holds the shift valve in its downshift position.

Throttle pressure is also directed to port 184 of downshift detent valve 180 through passage 232. This pressure has no function until the throttle is opened to the last 10° of throttle opening. In the range of the last 10° of throttle opening, detent valve 180 admits throttle pressure to spring chamber 120 of shift valve 115 by way of ports 184 and 183 of valve 180 and passage 233.

*Drive—direct lock-up*

As the vehicle speed increases with the selector valve 130 maintained in drive range, the governor pressure acting in chamber 122 and chamber 124 of shift valve 115 increases. This pressure opposes the throttle, modulator, and spring pressures acting on the opposite side of the shift valve. When the governor pressure exceeds these pressures, shift valve 115 moves to its upshift position.

With shift valve 115 in its upshift position, line pressure from passage 227 is directed through ports 125 and 127 of the shift valve to passage 235 leading to the direct clutch chamber 38 to apply the direct drive clutch. At the same time, line pressure is also directed through passage 235 to passage 228 through ports 148 and 149 of selector valve 130 and passage 228 to chamber 36a of the low gear brake servo to release the low gear brake. This oil pressure in chamber 36a plus the effect of the release springs overcomes the apply pressure in chamber 36 to release the low gear brake. The engagement of direct clutch 16 and release of low gear brake 34 places the transmission in direct lock-up. Line pressure is also directed through passage 228 to chamber 190 of downshift valve 180. This pressure has no effect until the last 10° of throttle opening.

*Drive—forced downshift*

To gain increased acceleration, it is often desirable to downshift the transmission from direct lock-up to reduction drive at a vehicle speed higher than that at which normal downshift occurs. This forced downshift is accomplished through action of the downshift detent valve 180 during the last 10° of throttle opening.

When the vehicle acceleration pedal is depressed to the vehicle floor board, downshift detent cam 181, operated by the same linkage (not shown) that operates the throttle valve cam 76, moves the detent valve 180 to connect passage 232 to passage 233 to admit throttle valve pressure to spring chamber 120 of shift valve 115. This throttle pressure, acting against large boss 123 of the shift valve, combined with spring pressure, overbalances the governor pressure opposing it. As a result the shift valve is moved to its downshift position and the transmission downshifts from direct lock-up to reduction drive. In its downshift position, port 126 of shift valve 115 exhausts pressure from passage 235 and chamber 38 of the direct lock-up clutch. The line pressure in chamber 190 of the downshift detent valve 180 is likewise exhausted to sump by way of passage 228 ports 149 and 148 of valve 130, passage 235 and port 126 of shift valve 115.

The removal of line pressure from chamber 190 of detent valve 180 gives the "detent feel" through the linkage to the accelerator pedal when the forced downshift takes place. After a forced downshift, the transmission will shift back to direct lock-up upon release of the accelerator pedal with consequent reduction of throttle pressure. If the accelerator pedal is held in the same position that caused forced downshift, the upshift will not occur until the vehicle has attained a speed of approximately 60 miles per hour, when the governor pressure is great enough to overcome the effect of throttle and spring pressures.

*Low range*

Figure 4:
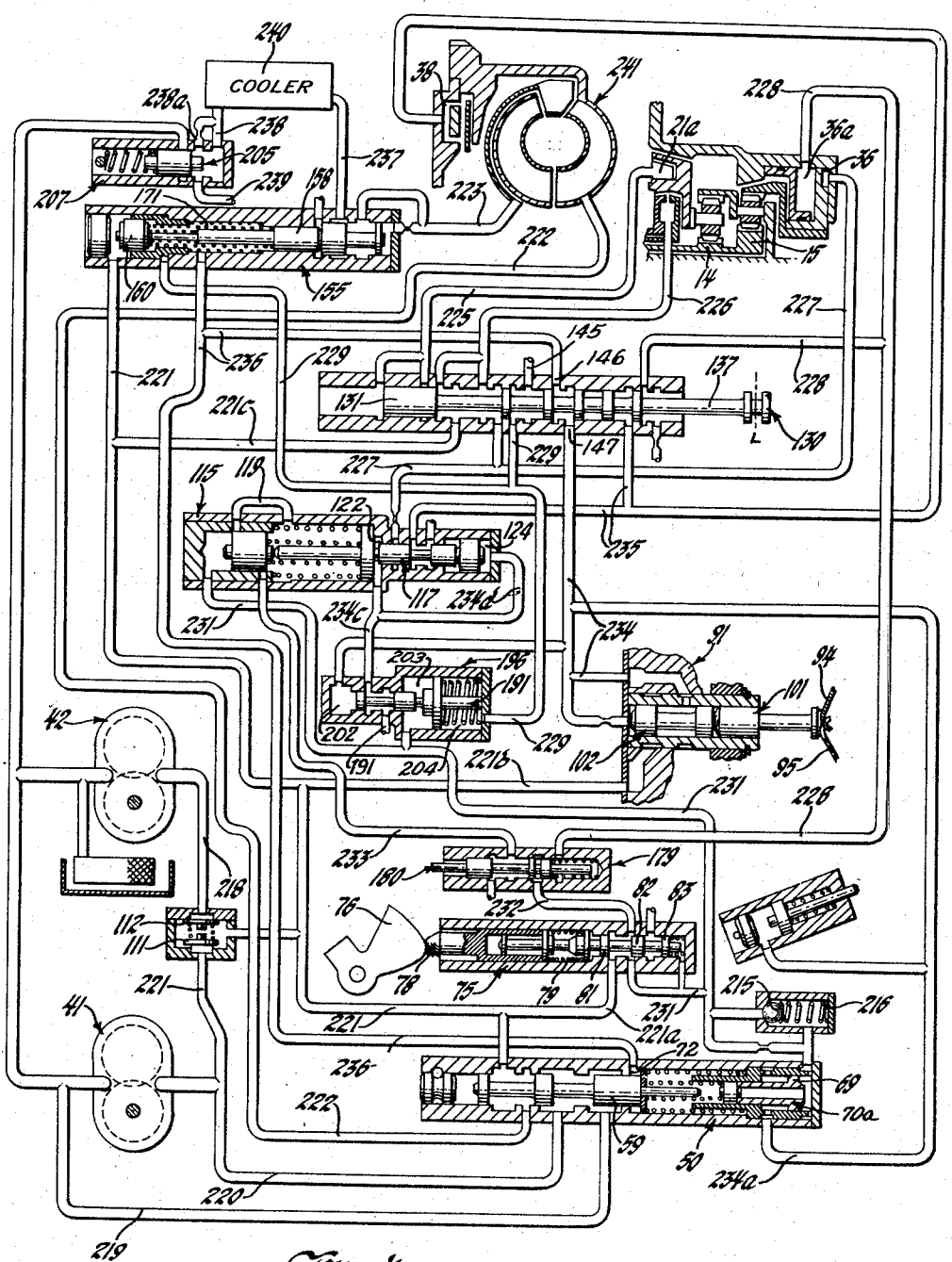
Figure 4 is a schematic diagram of the control system illustrating the system as conditioned for low range of operation.

Under certain operating conditions it may be desirable to maintain the transmission in low range regardless of vehicle speed. This is accomplished by placing the manual selector valve 130 in its "low" position. With the manual valve 130 in its "low" position as shown in Figure 4, governor pressure from passage 234 is admitted through ports 147 and 146 of manual valve 130 to passage 236 leading to the line pressure regulator valve spring chamber 72. Governor pressure is also directed through passage 236 to the converter valve spring chamber 171. This pressure, combined with the line and inner valve spring pressures, regulates the converter pressure as explained in conjunction with the description of the converter valve, at a value so calibrated as to insure a sufficient flow of oil through the oil cooler to meet the oil cooling requirements. With the selector valve 130 in low range position, oil pressure from chamber 204 of the coast valve 191 is exhausted by way of passage 229 and exhaust port 145 of the valve 130. Throttle pressure in chamber 203 and governor pressure in chamber 202 of the coast valve 191 then move the coast valve to block off governor pressure from passage 234c and chambers 122 and 124 of shift valve 115 and to exhaust chambers 122 and 124 of shift valve 115 through passage 234c and port 199 of coast valve 191. With no governor pressure available to upshift shift valve 115, the shift valve remains in its downshift position. With the exception of the above valve actions, the operation of the transmission in "low" range is exactly as in the low range operation of the "drive" position of the manual selector valve 130.

*Low range—over-run braking*

Figure 5:
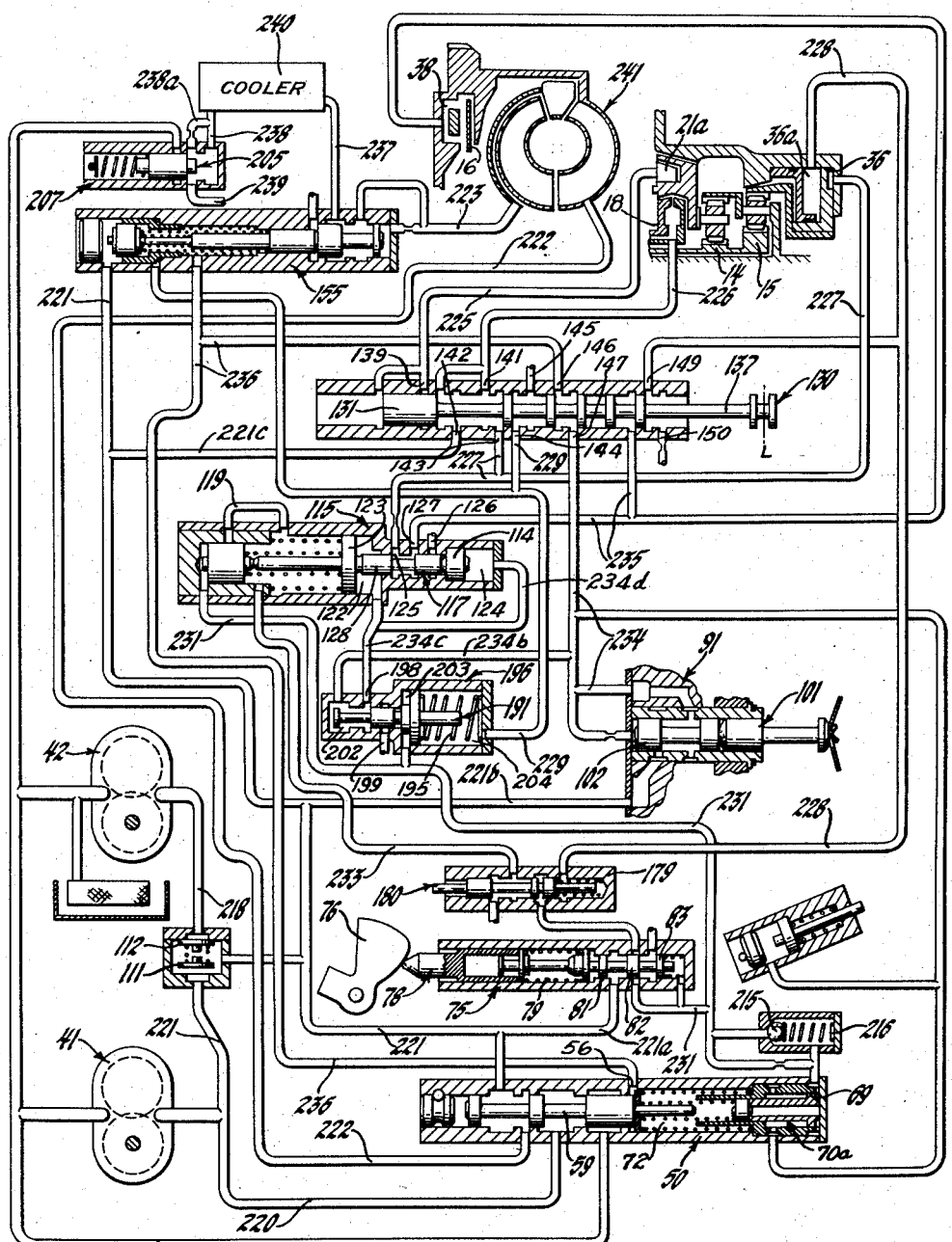
Figure 5 is a schematic diagram of the control system illustrating the control system as conditioned for low-range operation wherein "churn" or overrun braking is accomplished.

The condition of operation for over-run or churn braking is shown in Figure 5. When the selector valve 130 is placed in "low" position for downgrade engine braking, several valve actions occur. When the vehicle speed is reduced to approximately 35 miles per hour, the coast valve spring 195 overcomes the governor pressure in chamber 203 and moves the coast valve 191 to its open position, permitting governor pressure to flow from passage 234b to passage 234c leading to chambers 122 and 124 of the shift valve 115. The governor pressure acting in chamber 122 against large boss 123 and in chamber 124 against the shift valve governor plug 118 combined with the effect of line pressure acting upon land 128 of the shift valve overcomes the modulator and shift valve spring forces, and the shift valve is moved to its upshift position. Line pressure is admitted by way of ports 142 and 141 of manual selector valve 130 to passage 226 to apply neutral clutch 18 and by way of ports 125 and 127 of shift valve 115 to passage 235 leading to the direct clutch servo chamber 38 to apply the direct drive clutch. The release chamber 36a of the low gear brake piston 34 is exhausted by way of passage 228 and ports 149 and 150 of manual selector valve 130 and the apply chamber 36 is supplied with pressure through ports 142 and 143 of valve 130 and passage 227. The engagement of the direct clutch 16 while the low gear brake remains applied causes "churn" or over-run braking as heretofore described.

With the drive range selector valve 130 positioned in "low range," governor pressure is admitted to chamber 72 of the pressure regulator valve 50 through passage 234, ports 147 and 146 of valve 130, and passage 236 to port 56 of pressure regulator valve 50. The effect of governor pressure in chamber 72 of valve 50 is to increase the line pressure above the normal line pressure of 50 pounds per square inch at zero throttle. This increase is necessary to supply sufficient pressure to keep the low gear brake applied during churn braking.

As the vehicle speed is decreased below 35 miles per hour, governor pressure decreases until at approximately 18 miles per hour the combined modulator force and spring forces acting upon the shift valve overcome the governor and line pressures opposing them, moving the shift valve to its downshift position. The direct drive clutch is then exhausted through ports 127 and 126 of shift valve 115 and the transmission operates in normal low range.

*Reverse*

When the selector valve 130 is placed in its "reverse" position, line pressure is admitted to the reverse brake chamber 21a by way of passage 221c, ports 142 and 139 of valve 130 and passage 225. This applies the reverse brake. Line pressure is admitted to neutral clutch 18 by way of ports 142 and 141 of valve 130 and passage 226. Low gear brake chamber 36 is exhausted through passage 227 and ports 143 and 145 of valve 130. Chamber 204 of coast valve 191 is exhausted through passage 229 and ports 144 and 145 of valve 130. Throttle pressure in chamber 203 and governor pressure in chamber 202 of coast valve 191 force the coast valve to block off governor pressure from shift valve 115 and to exhaust passage 234c through ports 198 and 199 of the coast valve.

It is therefore impossible for the transmission to upshift when the selector valve 130 is placed in reverse.

The preceding description recites the objects, advantages and useful results of this invention which incorporate a number of features in combination, which are subject to change in specific arrangement and form of structure without departing from the spirit and scope of the invention as defined in the following claims.

I claim:

1. In a control system for a vehicle transmission having fluid pressure responsive servo members for establishing a plurality of drive ratios, a fluid pressure source, valve means including a manually operable selector valve connected to said source for controlling the admission of fluid pressure to said servos, a pressure regulator valve connected to said source having a plurality of control chambers for regulating the pressure level of fluid pressure supplied to said servos, a governor valve connected to said source for delivering a variable pressure to one of said control chambers, a valve connected to said source for delivering a variable pressure to a second of said control chambers, and a passage controlled by said manually operable selector valve for controlling the admission of governor pressure to a third of said control chambers.

2. In a control system for a vehicle transmission having fluid pressure responsive servo members for establishing different transmission drive ratios, a fluid pressure source, valve means including a manually operable valve connected to said source for controlling the transmission drive ratio, a pressure regulator valve connected to said source and having a plurality of control chambers for regulating the pressure level of fluid pressure supplied to said servos, a governor valve connected to said source for delivering a variable fluid pressure, an accelerator pedal operated valve connected to said source for delivering a variable fluid pressure, means connecting said governor valve to one of said control chambers, means connecting said accelerator pedal controlled valve to another of said control chambers, and means for connecting said governor valve to a third control chamber, said manually operable valve being effective in one position to connect said last-mentioned control chamber to exhaust and effective in another position to connect said last-mentioned control chamber to said governor valve.

3. In a control system for a vehicle transmission having fluid pressure responsive servo members for establishing a plurality of drive ratios, a fluid pressure source, valve means including a manually operable selector valve connected to said source for controlling the admission of fluid pressure to said servos, a pressure regulator valve connected to said source and having a plurality of control chambers for regulating the pressure level of fluid pressure supplied to said servos, a governor valve connected to said source for delivering a variable pressure to one of said control chambers, a valve connected to said source for delivering a variable pressure to a second of said control chambers, said governor pressure in said first control chamber and said pressure in said second control chamber acting in opposition to each other to regulate the pressure supplied to said servos, and a passage controlled by said manually operable selector valve for controlling the admission of governor pressure to a third of said plurality of control chambers, the governor pressure in said third control chamber acting in opposition to the governor pressure in said first-mentioned control chamber.

4. In a control system for a vehicle transmission having fluid pressure responsive servo members for establishing a plurality of drive ratios, a fluid pressure source, valve means including a manually operable selector valve connected to said source for controlling the admission of fluid pressure to said servos, a pressure regulator valve connected to said source and having a plurality of control chambers for regulating the pressure level of fluid pressure supplied to said servos, a governor valve connected to said source for delivering a variable pressure to one of said control chambers to decrease the pressure level of fluid delivered to said servos, a valve connected to said source for delivering a variable pressure to a second of said control chambers for increasing the pressure level of fluid delivered to said servos, and a passage controlled by said manually operable selector valve for delivering governor pressure to a third of said control chambers for increasing the pressure level of fluid pressure delivered to said servos.

5. In a control system for a transmission having fluid pressure responsive servo members for establishing a plurality of transmission drive ratios, a fluid pressure source, valve means including a manually operable selector valve and a shift valve for controlling the admission of fluid pressure to said servos, a governor for delivering a variable fluid pressure to said shift valve for biasing said shift valve to select one transmission drive ratio, an additional manually operable valve for delivering a variable fluid pressure to said shift valve for biasing said shift valve to select another transmission drive ratio, and an additional valve for controlling said shift valve, said additional valve being biased by pressure delivered by said additional manually operable control valve to block off governor pressure from said shift valve and biased by line pressure from said source under control of said selector valve to admit governor pressure to said shift valve.

6. In a control system for a transmission having fluid pressure responsive servo members for establishing a plurality of transmission drive ratios, a fluid pressure source, valve means including a shift valve and a manually operable selector valve for controlling the admission of fluid pressure to said servos, a governor for delivering a variable fluid pressure to said shift valve for biasing said shift valve to select one transmission drive ratio, a fluid pressure controlled valve for controlling the admission of fluid pressure to said shift valve, an additional manually controlled valve for delivering a variable fluid pressure to said fluid pressure controlled valve and to said shift valve, the fluid pressure delivered by said additional manually controlled valve being effective to bias said shift valve to select one transmission drive ratio and to bias said fluid pressure controlled valve to block off governor pressure from said shift valve, and a passage controlled by said manual valve for admitting fluid pressure from said source to said fluid pressure controlled valve, the pressure in said last-mentioned passage being effective to bias said fluid pressure controlled valve to admit governor pressure to said shift valve.

7. In a control system for a transmission having a torque converter and a plurality of fluid pressure responsive servo members for establishing different drive ratios, a fluid pressure source, means including a manually operable selector valve connected to said source for controlling the admission of fluid pressure to said servo members, a pressure regulator valve for controlling the pressure level of fluid pressure discharged from said torque converter, a control chamber in said pressure regulator valve, and a governor valve connected to said source for delivering a variable pressure to said control chamber through said selector valve, said selector valve being effective in one position to connect said control chamber to said governor valve and effective in a second position to connect said control chamber to exhaust.

8. In a control system for a transmission having a torque converter and a plurality of fluid pressure responsive servo members for establishing different transmission drive ratios, a fluid pressure source, means including a manually operable selector valve connected to said source for controlling the admission of fluid pressure to said servo members, a discharge passage for said torque converter, a pressure regulator valve for regulating the pressure in said converter discharge passage, a control chamber in said pressure regulator valve, a line pressure regulator valve connected to said source for controlling the pressure level of fluid pressure supplied to said servos, a control chamber in said line pressure regulator valve, and a governor valve connected to said source for delivering a variable pressure to both of said chambers through said manually operable selector valve, said manually operable selector valve being effective in one position to connect both of said control chambers to said governor valve and effective in a second position to connect both of said chambers to exhaust.

9. In a control system for a transmission having a torque converter, an oil cooler, and a plurality of fluid pressure responsive servo members for establishing different transmission drive ratios, a fluid pressure source, means including a manually operable selector valve connected to said source for controlling the admission of fluid pressure to said servo members, a passage connecting said torque converter to said oil cooler, a valve having a control chamber therein and effective to regulate the pressure level of fluid discharged from said converter, and a governor valve connected to said source effective to deliver a variable pressure to said control chamber through said selector valve, said selector valve being effective in one position to connect said control chamber to exhaust and effective in a second position to direct governor valve pressure to said control chamber.

10. In a control system for a transmission having a torque converter and a plurality of fluid pressure responsive servo members for establishing different transmission drive ratios, a fluid pressure source, means including a manually operable selector valve for controlling the admission of fluid pressure to said servos, a discharge passage for said torque converter, a first pressure regulator valve for reguating the pressure in said converter discharge passage, a line pressure regulator valve for controlling the pressure level of fluid pressure supplied to said servos, a first control chamber in said first-mentioned pressure regulator valve connected to said line pressure regulator valve, a second control chamber in said first-mentioned pressure regulator valve, and a control chamber in said line pressure regulator valve, a governor for delivering a variable pressure, a passage connecting both said second converter pressure regulator valve control chamber and said line pressure regulator valve control chamber to said governor through said manually operable valve, said manually operable selector valve being effective in one position to connect said passage to said governor and effective in a second position to connect said passage to exhaust.

11. In a control system for a vehicle transmission having fluid pressure responsive servo members for establishing a plurality of drive ratios, a fluid pressure source, means including a manually operable selector valve connected to said value for directing fluid pressure from said source to said servos, a pressure regulator valve connected to said source for controlling the pressure level of fluid pressure supplied to said servos, an accelerator pedal controlled valve connected to said source for delivering a variable fluid pressure, a governor valve connected to said source for delivering a variable fluid pressure, a control chamber in said pressure regulator valve connected to said governor valve, a control chamber in said pressure regulator valve connected to said accelerator pedal controlled valve, and a control chamber in said pressure regulator valve connected to said governor valve through said manually operable selector valve, said manually operable selector valve being effective in one position to connect said last-mentioned control chamber to said governor valve and effective in a second position to connect said last-mentioned control chamber to exhaust.

12. In a control system for a vehicle transmission having fluid pressure responsive servo members for establishing a plurality of drive ratios, a fluid pressure source, a pressure regulator valve for regulating the pressure level of fluid pressure supplied to said servos, a control chamber in said pressure regulator valve, an accelerator pedal controlled valve for delivering a variable pressure to said control chamber, a check valve for permitting unrestricted flow of fluid from said accelerator pedal controlled valve to said control chamber and for limiting the rate of fluid pressure discharge from said control chamber, a governor for delivering a variable fluid pressure, and a second control chamber in said pressure regulator valve connected to said governor.

13. In a control system for a transmission having fluid pressure responsive servo members for establishing a plurality of drive ratios, a fluid pressure source, means including a manually operable selector valve for directing fluid pressure from said source to said servos, a pressure regulator valve for controlling the pressure level of fluid pressure supplied to said servos, a control chamber in said pressure regulator valve, an accelerator pedal controlled valve for delivering a variable pressure to said control chamber, valve means intermediate said accelerator pedal controlled valve and said control chamber for restricting the rate of fluid pressure discharge from said control chamber, a governor for delivering a variable fluid pressure, a control chamber in said pressure regulator valve connected to said governor, and an additional control chamber in said pressure regulator valve connected to said governor through said manually operable selector valve, said selector valve being effective in one position to connect said last-mentioned control chamber to exhaust.

14. In a control system for a transmission having a torque converter and a plurality of fluid pressure responsive servo members for establishing different drive ratios, a fluid pressure source, means including a manually operable selector valve connected to said source for controlling the admission of fluid pressure to said servos to apply said servos, a pressure regulator valve for controlling the pressure level of fluid pressure in said torque converter, a passage connecting said torque converter to one of said servos whereby fluid pressure in said torque converter tends to release said servo, a control chamber in said pressure regulator valve, and a governor valve connected to said source for delivering a variable fluid pressure to said control chamber through said manually operable selector valve, said manually operable selector valve being effective in one position to connect said control chamber to said governor and effective in another position to connect said control chamber to exhaust.

15. In a control system for a transmission having a torque converter, an oil cooler, and a plurality of fluid pressure responsive servo members for establishing different drive ratios, a passage for admitting fluid pressure from said torque converter to one of said servo members, said torque converter pressure tending to release said servo, a discharge passage connecting said torque converter to said oil cooler, a fluid pressure source, means including a manually operable selector valve for controlling the admission of fluid pressure to said servos to apply said servos, a pressure regulator valve for regulating the pressure level of fluid pressure in said converter, a pressure regulator valve for regulating the pressure level of fluid pressure supplied to said servos, a control chamber in said first-mentioned pressure regulator valve connected to said second-mentioned pressure regulator valve, an accelerator pedal controlled valve for delivering a variable pressure, a governor for delivering a variable pressure, a control chamber in each of said pressure regulator valves adapted to be connected to said governor through said selector valve, and control chambers in said second-mentioned pressure regulator valve connected to said accelerator pedal controlled valve and said governor, respectively, said selector valve being movable to different positions to select different conditions of transmission operation and effective in one of said positions to connect said governor to one control chamber of each of said pressure regulator valves.

16. In a control system for a vehicle transmission having fluid pressure responsive servo members for establishing different drive ratios, a torque converter, a pressure regulator valve for controlling the pressure level of fluid pressure discharged from said torque converter, a fluid pressure source, a line pressure regulator valve for controlling the pressure level of fluid pressure supplied to said servos connected to said fluid pressure source, a speed responsive governor valve hydraulically connected to said fluid pressure source and adapted to deliver a variable fluid pressure which varies with vehicle speed to said line pressure regulator valve, means including a drive range selector valve connected to said fluid pressure source for controlling the admission of fluid pressure to said servos, said converter discharge pressure regulator valve being effective in one position of said drive range selector valve to maintain the converter discharge pressure at a predetermined pressure differential less than line pressure, said converter discharge pressure regulator valve being effective in a second position of said drive range selector valve to maintain the converter discharge pressure at a different predetermined pressure differential from line pressure, said converter discharge pressure regulator valve being effective in a third position of said drive range selector valve to maintain said converter discharge pressure at a third predetermined pressure differential from said line pressure.

17. In a control system for a vehicle transmission having fluid pressure responsive servo members for establishing a plurality of transmission drive ratios, a fluid pressure source, valve means including a drive range selector valve connected to said source for controlling the transmission drive ratio, a vehicle speed responsive governor valve hydraulically connected to said fluid pressure source and adapted to deliver a variable fluid pressure which varies with vehicle speed, an accelerator pedal controlled valve connected to said source effective to deliver a variable fluid pressure which varies in accordance with the position of said accelerator pedal, a pressure regulator valve connected to said source for controlling the pressure level of fluid pressure delivered to said servos, a first control chamber hydraulically connected to fluid pressure delivered by said governor valve, said governor valve pressure in said control chamber being effective to decrease the pressure level of fluid pressure delivered by said pressure regulator valve with increase in vehicle speed, a second control chamber in said pressure regulator valve hydraulically connected to said accelerator pedal controlled valve, the pressure in said second control chamber being effective to increase the pressure delivered by said pressure regulator valve as said accelerator pedal is depressed, and a third control chamber in said pressure regulator valve, said selector valve being effective in one position to connect said third chamber to exhaust and effective in a second position to connect said third chamber to pressure delivered by said governor valve, said governor valve pressure in said third control chamber being effective to increase the pressure delivered by said pressure regulator valve.

18. In a control system for a transmission having a torque converter and a plurality of fluid pressure responsive servo members for establishing different drive ratios, a fluid pressure source, means including a manually operable selector valve connected to said source for controlling the admission of fluid pressure to said servo members, a first pressure regulator valve connected to said source for controlling the pressure level of fluid pressure admitted to said torque converter, a second pressure regulator valve connected to said torque converter for controlling the pressure level of fluid pressure discharge from said torque converter, a control chamber in said second pressure regulator valve, and a speed responsive governor valve connected to said source and said manually operable selector valve for delivering a variable fluid pressure to said manually operable selector valve, said manually operable selector valve being effective in one position to connect said control chamber to said governor valve and effective in a second position to connect said control chamber to exhaust.

19. In a control system for a transmission having a torque converter and a plurality of fluid pressure responsive servo members for establishing different drive ratios, a fluid pressure source, means including a drive range selector valve connected to said source for controlling the admission of fluid pressure to said servo members, a line pressure regulator valve connected to said source for controlling the pressure level of fluid pressure supplied to said servos and to said torque converter, first and second control chambers in said line pressure regulator valve, a speed responsive governor valve hydraulically connected to said source and to said first control chamber, a converter discharge passage, a second pressure regulator valve for controlling pressure in said discharge passage, a first control chamber in said second pressure regulator valve hydraulically connected to the line pressure controlled by said line pressure regulator valve, a second control chamber in said second pressure regulator valve, said drive range selector valve being effective in one position to connect both said second control chambers to said hydraulic governor valve, said drive range selector valve being effective in a second position to connect both said second control chambers to exhaust.

20. In a control system for a transmission having a torque converter and a plurality of fluid pressure controlled servo members for establishing different drive ratios, a fluid pressure source, means including a drive range selector valve connected to said source for controlling the admission of fluid pressure to said servo members, a line pressure regulator valve connected to said source for controlling the pressure level of fluid pressure supplied to said servos and to said torque converter, first and second control chambers in said line pressure regulator valve, a speed responsive governor valve hydraulically connected to said first control chamber, a converter discharge passage, a second pressure regulator valve for controlling the pressure in said discharge passage, a first control chamber in said second pressure regulator valve hydraulically connected to the line pressure controlled by said line pressure regulator valve, a second control chamber in said second pressure regulator valve, a third control chamber in said second pressure regulator valve, said drive range selector valve being effective in one position to connect said second control chambers of both said pressure regulator valves to said governor valve and to connect said third chamber of said second pressure regulator valve to exhaust, said drive range selector valve being effective in a second position to connect said third control chamber of said second pressure regulator valve to line pressure delivered by said line pressure regulator valve and to connect the second control chambers of both said line pressure regulator valve and said second pressure regulator valve to exhaust.

21. In a control system for a transmission having a torque converter and a plurality of fluid pressure responsive servo members for establishing different drive ratios, a fluid pressure source, means including a drive range selector valve connected to said source and a fluid pressure controlled shift valve connected to said source through said drive range selector valve for controlling the admission of fluid pressure to said servo members, a line pressure regulator valve connected to said source for controlling the pressure level of fluid pressure supplied to said servos and to said torque converter, a torque converter discharge passage, a second pressure regulator valve for controlling the pressure in said discharge passage, a speed responsive governor valve connected to said source and hydraulically connected to said selector valve, to a control chamber of said line pressure regulator valve and to a third valve, said third valve being effective valve to control the admission of governor pressure to said shift valve for controlling the position of said shift valve connected to said source, an accelerator pedal controlled valve adapted to deliver a variable pressure to a second control chamber of said line pressure regulator valve, to a control chamber of said shift valve and to a control chamber of said third valve, a control chamber in said second pressure regulator valve hydraulically connected to line pressure delivered by said line pressure regulator valve, second and third control chambers in said second pressure regulator valve, a third control chamber in said line pressure regulator valve, a second control chamber in said third valve, said selector valve being effective in a position to direct governor delivered pressure to said second control chamber of said second pressure regulator valve and to a third control chamber of said line pressure regulator valve, said selector valve also being effective in said one position to connect said second control chamber of said third valve to exhaust, said selector valve being effective in a second position to connect said second control chamber of said second pressure regulator valve and said third control chamber of said line pressure regulator valve to exhaust, said selector valve also being effective in said second position to direct line pressure to a third control chamber of said second pressure regulator valve and to said second control chamber of said third valve.

22. In a control system for a transmission having a torque converter and a plurality of fluid pressure controlled servo members for establishing different drive ratios, a fluid pressure source, means including a manually operable drive range selector valve connected to said source for controlling the admission of fluid pressure to said servos, a discharge passage for said torque converter, a first pressure regulator valve for regulating the pressure in said converter discharge passage hydraulically connected to an oil cooler, a pressure regulator valve for regulating the pressure in said oil cooler, a line pressure regulator valve connected to said source for controlling the pressure level of fluid pressure supplied to said servos, a first control chamber in said first-mentioned pressure regulator valve connected to said line pressure regulator valve, a second control chamber in said first-mentioned pressure regulator valve and a control chamber in said line pressure regulator valve, a governor valve connected to said source for delivering a variable pressure, a passage connecting both said converter pressure regulator valve control chamber and said line pressure regulator valve control chamber to said governor valve through said manually operable valve, said manually operable selector valve being effective in one position to connect said passage to said governor valve and effective in a second position to connect said passage to exhaust.

23. In a control system for a vehicle transmission having fluid pressure servo members for establishing a plurality of drive ratios, a fluid pressure source, means including a manually operable selector valve connected to said source for controlling the admission of fluid pressure to said servos, a discharge passage for said torque converter, a first pressure regulator valve for regulating the pressure in said converter discharge passage, a line pressure regulator valve connected to said source for controlling the pressure level of fluid pressure supplied to said servos, a first control chamber in said first pressure regulator valve connected to said line pressure regulator valve, an accelerator pedal controlled valve connected to said source for delivering a variable fluid pressure, a governor valve connected to said source for delivering a variable fluid pressure, a control chamber in said line pressure regulator valve connected to said governor valve, a control chamber in said line pressure regulator valve connected to said accelerator pedal controlled valve, a third control chamber in said line pressure regulator valve, a second control chamber in said first-mentioned pressure regulator valve, and a passage connecting said third control chamber of said line pressure regulator valve and said second chamber of said first-mentioned pressure regulator valve to said manually operable selector valve, said manually operable selector valve being effective in one position to connect said passage to said governor valve and effective in a second position to connect said passage to exhaust.

References Cited in the file of this patent

UNITED STATES PATENTS

| | | |
|---|---|---|
| 2,516,208 | Hasbany | July 25, 1950 |
| 2,567,042 | Wemp | Sept. 4, 1951 |
| 2,604,197 | Livermore | July 22, 1952 |
| 2,630,895 | McFarland | Mar. 10, 1953 |
| 2,633,035 | Livermore | Mar. 31, 1953 |
| 2,640,373 | Jandasek | June 2, 1953 |
| 2,645,137 | Roche | July 14, 1953 |
| 2,667,085 | Ackerman | Jan. 26, 1954 |
| 2,770,148 | Wayman | Nov. 13, 1956 |